United States Patent
Yen (10) Patent No.: US 12,505,661 B2
(45) Date of Patent: Dec. 23, 2025

(54) METHOD FOR DETECTING IMAGE SIZES, COMPUTER DEVICE, AND STORAGE MEDIUM

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 375 days.

(21) Appl. No.: 18/210,755

(22) Filed: Jun. 16, 2023

(65) Prior Publication Data
US 2024/0096079 A1 Mar. 21, 2024

(30) Foreign Application Priority Data
Sep. 20, 2022 (CN) .......................... 202211140973.6

(51) Int. Cl.
| | |
|---|---|
| *G06K 9/00* | (2022.01) |
| *G06T 1/60* | (2006.01) |
| *G06V 10/77* | (2022.01) |
| *G06V 10/82* | (2022.01) |
| *G06V 10/94* | (2022.01) |

(52) U.S. Cl.
CPC ................ *G06V 10/82* (2022.01); *G06T 1/60* (2013.01); *G06V 10/7715* (2022.01); *G06V 10/94* (2022.01)

(58) Field of Classification Search
CPC .... G06V 10/82; G06V 10/7715; G06V 10/94; G06V 10/44; G06N 3/08; G06T 1/60; G06T 3/40; G06T 7/60
See application file for complete search history.

(56) References Cited

FOREIGN PATENT DOCUMENTS

CN 112686822 A * 4/2021

OTHER PUBLICATIONS

Luo, J. H., Wu, J., & Lin, W. (2017). Thinet: A filter level pruning method for deep neural network compression. In Proceedings of the IEEE international conference on computer vision (pp. 5058-5066). (Year: 2017).*
Lin, J., Rao, Y., Lu, J., & Zhou, J. (2017). Runtime neural pruning. Advances in neural information processing systems, 30. (Year: 2017).*

* cited by examiner

*Primary Examiner* — Gregory A Morse
*Assistant Examiner* — Kevin M Coomber
(74) *Attorney, Agent, or Firm* — ScienBiziP, P.C.

(57) ABSTRACT

A method for detecting image sizes using a computer device is provided. In the method, the computer device obtains a pre-trained image processing model and an input image, establishes a stack according to a number of network layers of the pre-trained image processing model. Output feature maps are obtained by processing the input image using the pre-trained image processing model. Image sizes of the output feature maps are detected. The image sizes are written into the stack in sequence, and the network layers deleted iteratively in an order from large to small according to an execution sequence of the network layers of the pre-trained image processing model until the stack is full. By performing the method, output sizes of the input image can be obtained, and a detection efficiency of image sizes can be improved.

20 Claims, 5 Drawing Sheets

METHOD FOR DETECTING IMAGE SIZES, COMPUTER DEVICE, AND STORAGE MEDIUM

FIELD

The present application relates to a technical field of image analysis, and more particularly to a method for detecting image sizes, a computer device, and a storage medium.

BACKGROUND

In a process of using a neural network model to process images, it is necessary to detect image sizes of a plurality of feature maps output by each network layer of the neural network model, so that a user can reserve a certain size of memory space for the plurality of output feature maps in advance. However, it cannot be efficiently detect the plurality of image sizes in each network layer of the neural network model.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
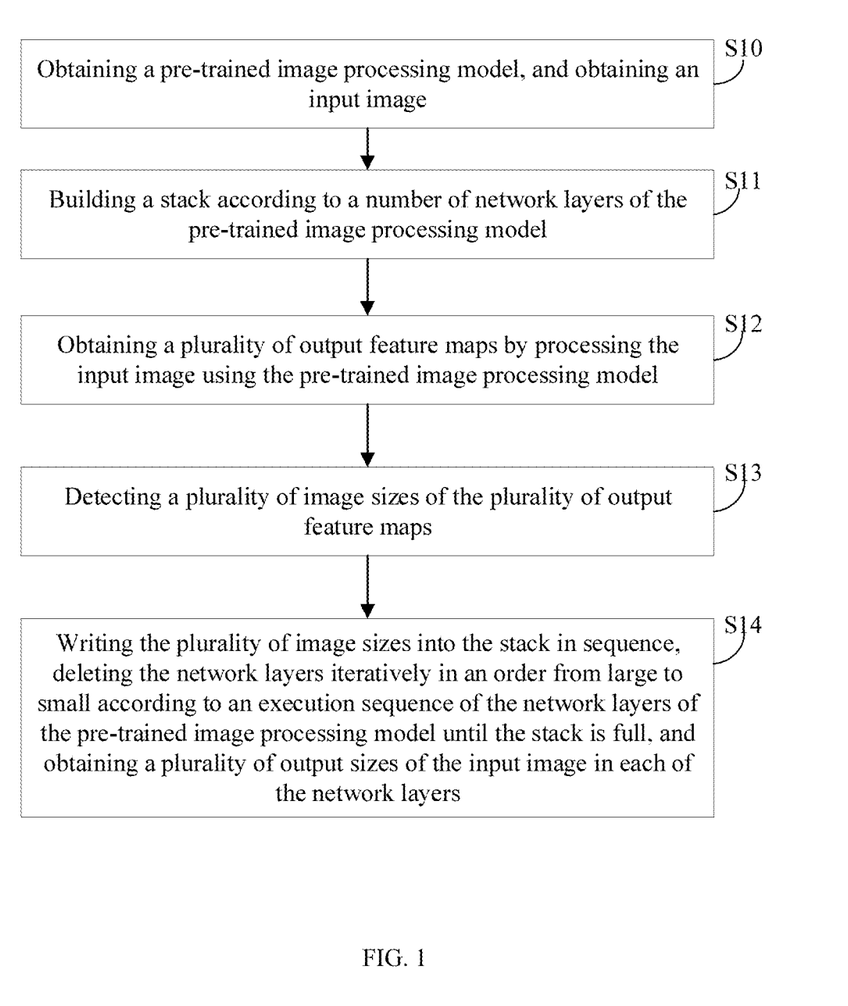
FIG. 1 is a flowchart diagram of a method for detecting image sizes in an embodiment of the present disclosure.

FIG. 1 is a flowchart diagram of a method for detecting image sizes in an embodiment of the present disclosure.

Figure 5:
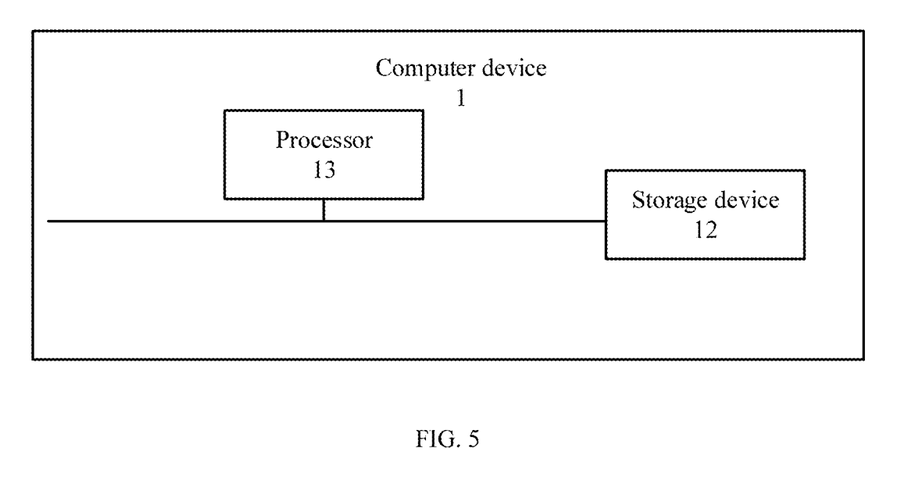
FIG. 5 is a structural diagram of a computer device housing a detection device in an embodiment of the present disclosure.

In one embodiment, the method for detecting image sizes can be applied to one or more computer devices (e.g., a computer device 1 as shown in FIG. 5), for determining defects of products. The computer device may include hardware such as, but not limited to, a microprocessor and an Application Specific Integrated Circuit (ASIC), a Field-Programmable Gate Array (FPGA), a Digital Signal Processor (DSP), and embedded devices, for example.

The computer device may be any electronic equipment that can interact with a user, such as a personal computer, a tablet computer, a smart phone, a personal digital assistant (Personal Digital Assistant, PDA), a game console, and an interactive network television, Internet Protocol Television (IPTV), or smart wearable devices, for example.

The computer device may also include a network device and/or a user device. The network device includes, but is not limited to, a single network server, a server group composed of multiple network servers, or a cloud composed of a large number of hosts or network servers based on a cloud computing technology.

A network can include, but is not limited to, the Internet, a wide area network (WAN), a metropolitan area network, a local area network, and a virtual private network (VPN), for example.

In block S10, the computer device obtains a pre-trained image processing model, and obtains an input image.

In one embodiment, the pre-trained image processing model represents a model corresponding to requirements of a triggering user, and the pre-trained image processing model may be a convolutional neural network. The embodiment does not limit a number of networks and a number of layers of the pre-trained image processing model. The input image can be any type of image. The input image may be obtained from a camera device, or from a database that stores images.

Figure 2:
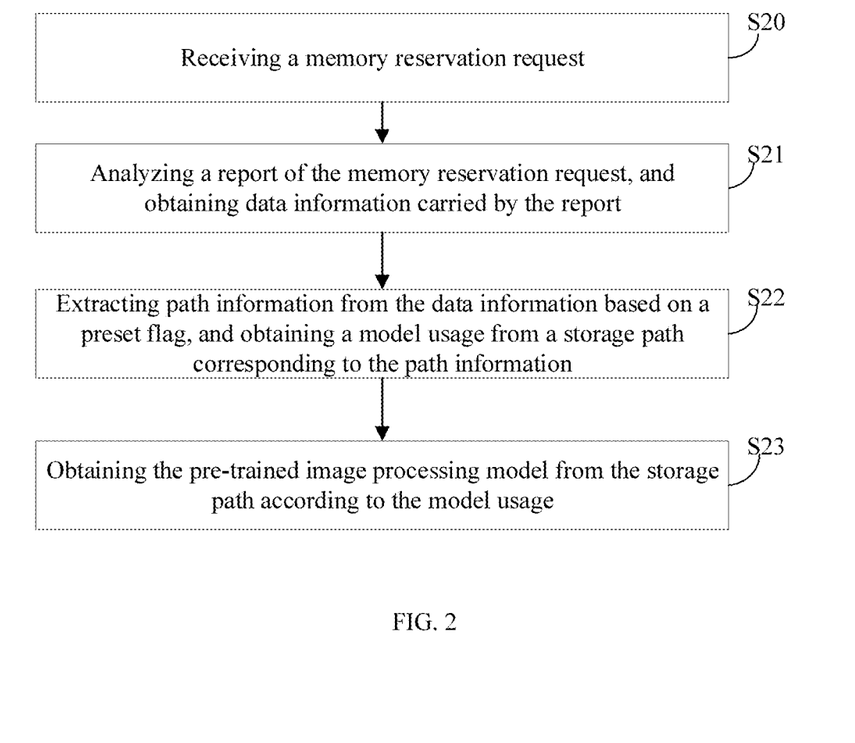
FIG. 2 is a flowchart diagram of a method for obtaining a pre-trained image processing model in an embodiment of the present disclosure.

FIG. 2 is a flowchart diagram of a method for obtaining a pre-trained image processing model in an embodiment of the present disclosure. In one embodiment, in block S20, the computer device receives a memory reservation request, and in block S21, the computer device analyzes a report of the memory reservation request, and data information of the report is obtained. In block S22, the computer device extracts path information from the data information based on a preset flag, and the computer device obtains a model usage from a storage path corresponding to the path information. In block S23, the computer device obtains the pre-trained image processing model according to the storage path and the model usage.

The memory reservation request carries the path information, which indicates the storage path. The preset flag is used to indicate the path information, and the path information may be information such as a path address of the storage path in the computer device. The model usage indicates a specific usage of a model.

Since there is no need to analyze the memory reservation request, the generation efficiency of the data information can be improved by analyzing the report, so that the acquisition efficiency of the pre-trained image processing model can be improved. Furthermore, an accurate image processing model can be obtained through the model usage.

Figure 3:
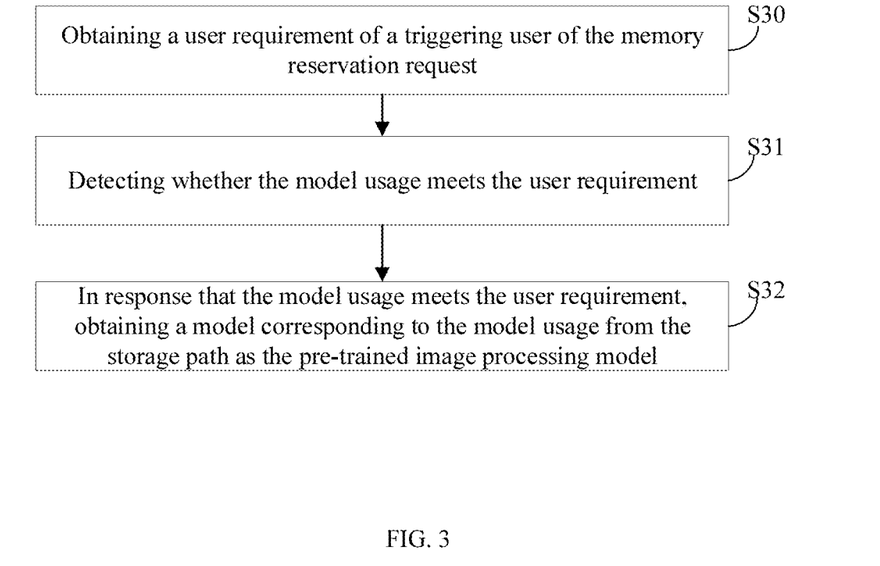
FIG. 3 is a flowchart diagram of a method for obtaining the pre-trained image processing model from a storage path according to a model usage in an embodiment of the present disclosure.

FIG. 3 is a flowchart diagram of a method for obtaining the pre-trained image processing model from a storage path according to a model usage in an embodiment of the present disclosure. In one embodiment, in block S30, the computer device obtains a user requirement of the user who triggers the memory reservation request, and in block S31, the computer device detects whether the model usage meets the user requirement. In block S32, in response that the model usage meets the user requirement, the computer device obtains a model corresponding to the model usage from the storage path, the obtained model is determined as the pre-trained image processing model.

The user requirement represents a specified action or event that the user wants to perform. For example, the user requirement may be classification of images.

By comparing the model usage with the user requirement, the model usage can be verified, thus an accurate image processing model can be obtained.

In block S11, the computer device establishes a stack according to a number of network layers of the pre-trained image processing model.

In one embodiment, a number of storage areas in the stack is equal to the number of the network layers of the pre-trained image processing model.

In one embodiment, the computer device counts the number of the network layers of the pre-trained image processing model. The computer device sets storage areas according to the number of the network layers. In response that the number of storage areas is equal to the number of the network layers, the number of storage areas is determined to be the stack.

According to the number of the network layers, a construction quantity of the storage areas can be controlled, so that a reasonable stack can be obtained.

In block S12, the computer device obtains a plurality of output feature maps by processing the input image using the pre-trained image processing model.

In one embodiment, the plurality of output feature maps may be in a matrix form or images, and the embodiments do not limit a specific form of the plurality of output feature maps.

The manner that the computer device processes the input image by using the pre-trained image processing model can refer to related arts, and is not described in detail in the embodiments.

In block S13, the computer device detects a plurality of image sizes of the plurality of output feature maps.

In one embodiment, the plurality of image sizes represents a space occupied by the plurality of output feature maps.

In one embodiment, in response that the plurality of output feature maps are in a matrix form, the computer device obtains a target matrix having a number of rows and a number of columns from a storage device of the computer device, the number of rows and the number of columns are greater than a preset threshold. The computer device detects a matrix capacity of the target matrix in the computer device, and the computer device counts a target row number and a target column number of the target matrix. The computer device counts an output row number and an output column number of the plurality of output feature maps, and the computer device generates the plurality of image sizes according to a calculation formula, the matrix capacity, the target row number, the target column number, the output row number and the output column number. The calculation formula is represented as:

$$y = \frac{k}{a \times b} \times m \times n,$$

y represents the plurality of image sizes, k represents the matrix capacity, a represents the target row number, b represents the target column number, m represents the output row number, and n represents the output column number.

The preset threshold can be selected randomly. It can be understood that, in order to accurately determine a capacity occupied by each value, the preset threshold should be as large as possible.

According to the preset threshold, a reasonable target matrix can be selected for analyzing the plurality of image sizes of the plurality of output feature maps, thereby improving the accuracy of the plurality of image sizes.

In one embodiment, in response that the plurality of output feature maps are images, the computer device identifies a plurality of pixel types of a plurality of pixels in the plurality of output feature maps. A pixel capacity is obtained occupied by a plurality of pixel points corresponding to the plurality of pixel types. The computer device counts a number of the plurality of pixels in the plurality of output feature maps, and generates the plurality of image sizes according to the pixel capacity and the number of the plurality of pixels.

The pixel type may be a binary type. For example, in response that the plurality of output feature maps are binary images, the pixel type of each of the plurality of output feature maps is a binary type, and the pixel capacity is 1 bit.

By identifying the pixel type, the pixel capacity can be accurately determined, so that the plurality of image sizes can be accurately determined according to the pixel capacity and the number of the plurality of pixels.

In block S14, the computer device writes the plurality of image sizes into the stack in sequence, and deletes the network layers iteratively in an order from large to small according to an execution sequence of the network layers of the pre-trained image processing model until the stack is full. Then a plurality of output sizes of the input image in each of the network layers are obtained.

In one embodiment, the execution sequence represents a network hierarchy of the network layers of the pre-trained image processing model. The stack is a full stack, which indicates that there is no free storage area in the stack.

In one embodiment, the computer device writes the plurality of image sizes into the stack in an order from bottom to up.

In the above embodiments, according to the number of network layers of the pre-trained image processing model, the computer device can establish a reasonable stack. Furthermore, based on the stack, the deletion of the network layers can be accurately controlled, so as to avoid invalid deletion of the network layers. According to the execution sequence, the network layer is deleted as an image processing model for the next iterative processing in an order from large to small. The input image is processed according to the image processing model obtained by iterative processing. The generation efficiency of the plurality of output feature maps can be improved, so that the size detection efficiency of the plurality of output feature maps can be improved.

Figure 4:
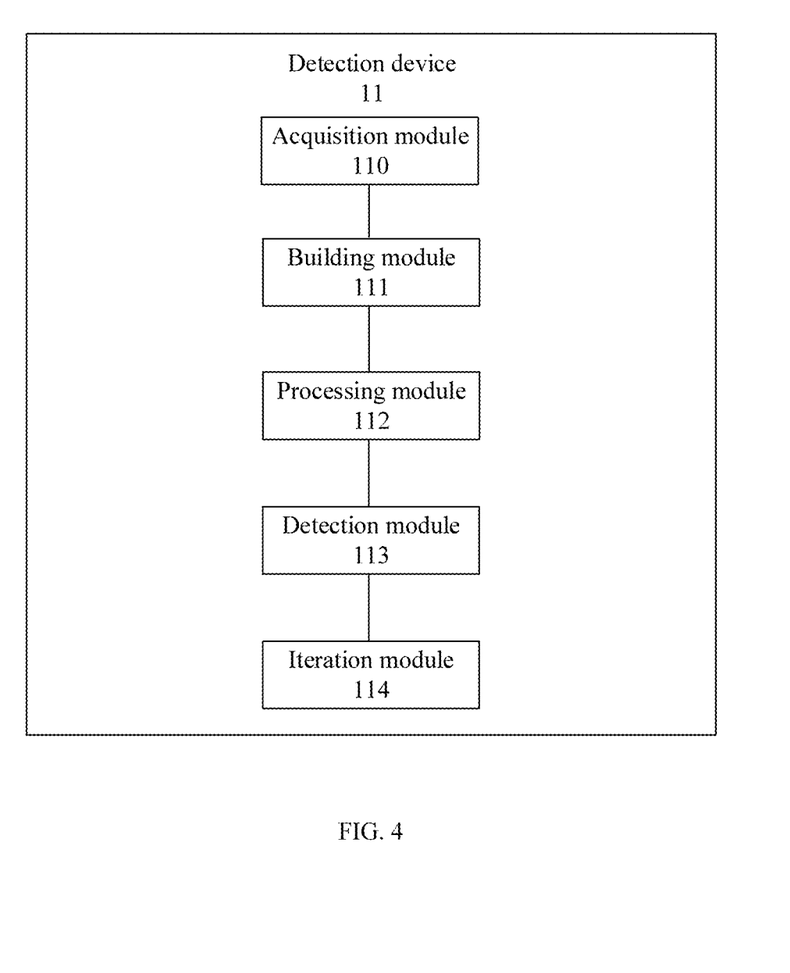
FIG. 4 is a structural diagram of a detection device in an embodiment of the present disclosure.

FIG. 4 is a structural diagram of a detection device in an embodiment of the present disclosure.

As shown in FIG. 4, a detection device 11 includes an acquisition module 110, a establishing module 111, a processing module 112, a detection module 113 and an iteration module 114. The modules in the embodiment refer to one of a series of stored computer-readable instruction segments that can be executed by at least one processor and that are capable of performing preset functions. In some embodiments, the functions of each module will be described. The acquisition module 110 obtains a pre-trained image processing model, and the acquisition module 110 obtains an input image. The establishing module 111 establishes a stack according to a number of network layers of the pre-trained image processing model. The processing module 112 obtains a plurality of output feature maps by processing the input image using the pre-trained image processing model. The detection module 113 detects a plurality of image sizes of the plurality of output feature maps. The iteration module 114 writes the plurality of image sizes into the stack in sequence, deletes the network layers iteratively in an order from large to small according to an execution sequence of the network layers of the pre-trained image processing model until the stack is full, and obtains a plurality of output sizes of the input image in each of the network layers.

FIG. 5 is a structural diagram of a computer device housing the detection device in an embodiment of the present disclosure.

The computer device 1 may include a storage device 12, and at least one processor 13. Computer-readable instructions are stored in the storage device 12 and executable by the at least one processor 13.

Those skilled in the art will understand that FIG. 5 is only an example of the computer device 1 and does not constitute a limitation on the computer device 1. Another computer device 1 may include more or fewer components than shown in the figures or may combine some components or have different components. For example, the computer device 1 may further include an input/output device, a network access device, a bus, and the like.

The at least one processor 13 can be a central processing unit (CPU), or can be other general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the computer device 1 and connects various parts of the entire computer device 1 by using various interfaces and lines.

The processor 13 executes the computer-readable instructions to implement the method for detecting image sizes in the above embodiments, such as in block S10-S14 shown in FIG. 1. Alternatively, the processor 13 executes the computer-readable instructions to implement the functions of the modules/units in the foregoing device embodiments, such as the modules 110-114 in FIG. 4.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the computer device 1. For example, the computer-readable instruction can be divided into the acquisition module 110, the establishing module 111, the processing module 112, the detection module 113 and the iteration module 114 as shown in FIG. 4.

The storage device 12 stores the computer-readable instructions and/or modules/units. The processor 13 may run or execute the computer-readable instructions and/or modules/units stored in the storage device 12 and may call up data stored in the storage device 12 to implement various functions of the computer device 1. The storage device 12 mainly includes a program storage area and a data storage area. The storage area for programs may store an operating system, and an application program required for at least one function (such as a sound playback function, an image playback function, for example), for example. The storage area for data may store data (such as audio data, phone book data, for example) created during the use of the computer device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 12 may be an external memory and/or an internal memory of the computer device 1. The storage device 12 may be a memory in a physical form, such as a memory stick, or a Trans-flash Card (TF card), for example.

When the modules/units integrated into the computer device 1 are implemented in the form of independent software functional units, they can be stored in a non-transitory readable storage medium. Based on this understanding, all or some of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 12 in the computer device 1 stores a plurality of instructions to implement a method for detecting image sizes, and the processor 13 can execute the multiple instructions to: obtain a pre-trained image processing model, and obtain an input image; establish a stack according to a number of network layers of the pre-trained image processing model; obtain a plurality of output feature maps by processing the input image using the pre-trained image processing model; detect a plurality of image sizes of the plurality of output feature maps; write the plurality of image sizes into the stack in sequence, delete the network layers iteratively in an order from large to small according to an execution sequence of the network layers of the pre-trained image processing model until the stack is full, and obtain a plurality of output sizes of the input image in each of the network layers.

The computer-readable instructions are executed by the processor 13 to realize the functions of each module/unit in the above-mentioned device embodiments, which will not be repeated here.

In the several embodiments provided in the preset embodiment, the disclosed computer device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, not a particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for detecting image sizes, applied to a computer device, the method comprising:
   obtaining a pre-trained image processing model, and obtaining an input image;
   establishing a stack according to a number of network layers of the pre-trained image processing model;
   obtaining a plurality of output feature maps by processing the input image using the pre-trained image processing model;
   detecting a plurality of image sizes of the plurality of output feature maps;
   writing the plurality of image sizes into the stack in sequence, deleting the network layers iteratively in an order from large to small according to an execution sequence of the network layers of the pre-trained image processing model until the stack is full, and obtaining a plurality of output sizes of the input image in each of the network layers.

2. The method for detecting image sizes of claim 1, wherein obtaining the pre-trained image processing model comprises:
   receiving a memory reservation request;
   analyzing a report of the memory reservation request, and obtaining data information carried by the report;
   extracting path information from the data information based on a preset flag, and obtaining a model usage from a storage path corresponding to the path information; and
   obtaining the pre-trained image processing model from the storage path according to the model usage.

3. The method for detecting image sizes of claim 2, wherein obtaining the pre-trained image processing model from the storage path according to the model usage comprises:
   obtaining a user requirement of a triggering user of the memory reservation request;
   detecting whether the model usage meets the user requirement; and
   in response that the model usage meets the user requirement, obtaining a model corresponding to the model usage from the storage path as the pre-trained image processing model.

4. The method for detecting image sizes of claim 1, wherein establishing the stack according to the number of network layers of the pre-trained image processing model comprises:
   counting the number of the network layers of the pre-trained image processing model;
   establishing storage areas according to the number of the network layers, and in response that a number of storage areas is equal to the number of the network layers, determining the number of storage areas as the stack.

5. The method for detecting image sizes of claim 1, wherein detecting the plurality of image sizes of the plurality of output feature maps comprises:
   in response that the plurality of output feature maps are in a matrix form, obtaining a target matrix with a number of rows and a number of columns from a storage device of the computer device, the number of rows and the number of columns being greater than a preset threshold;
   detecting a matrix capacity of the target matrix in the computer device, and counting a target row number and a target column number of the target matrix;
   counting an output row number and an output column number of the plurality of output feature maps;
   generating the plurality of image sizes according to a calculation formula, the matrix capacity, the target row number, the target column number, the output row number and the output column number, the calculation formula being represented as:

$$y = \frac{k}{a \times b} \times m \times n,$$

wherein y represents the plurality of image sizes, k represents the matrix capacity, a represents the target row number, b represents the target column number, m represents the output row number, and n represents the output column number.

6. The method for detecting image sizes of claim 1, wherein detecting the plurality of image sizes of the plurality of output feature maps comprises:
   in response that the plurality of output feature maps are images, identifying a plurality of pixel types of a plurality of pixels in the plurality of output feature maps;
   obtaining a pixel capacity occupied by a plurality of pixel points corresponding to the plurality of pixel types;
   counting a number of the plurality of pixels in the plurality of output feature maps; and
   generating the plurality of image sizes according to the pixel capacity and the number of the plurality of pixels.

7. The method for detecting image sizes of claim 1, wherein writing the plurality of image sizes into the stack in sequence comprises:
   writing the plurality of image sizes into the stack in an order from bottom to up.

8. A computer device comprising:
   a processor; and
   a storage device storing a plurality of instructions, which when executed by the processor, cause the processor to:
   obtain a pre-trained image processing model, and obtain an input image;
   establish a stack according to a number of network layers of the pre-trained image processing model;

obtain a plurality of output feature maps by processing the input image using the pre-trained image processing model;

detect a plurality of image sizes of the plurality of output feature maps;

write the plurality of image sizes into the stack in sequence, delete the network layers iteratively in an order from large to small according to an execution sequence of the network layers of the pre-trained image processing model until the stack is full, and obtain a plurality of output sizes of the input image in each of the network layers.

9. The computer device of claim 8, wherein the processor is further caused to:

receive a memory reservation request;

analyze a report of the memory reservation request, and obtain data information carried by the report;

extract path information from the data information based on a preset flag, and obtain a model usage from a storage path corresponding to the path information; and obtain the pre-trained image processing model from the storage path according to the model usage.

10. The computer device of claim 9, wherein the processor is further caused to:

obtain a user requirement of a triggering user of the memory reservation request;

detect whether the model usage meets the user requirement; and in response that the model usage meets the user requirement, obtain a model corresponding to the model usage from the storage path as the pre-trained image processing model.

11. The computer device of claim 8, wherein the processor is further caused to:

count the number of the network layers of the pre-trained image processing model;

establish storage areas according to the number of the network layers, and in response that a number of storage areas is equal to the number of the network layers, determine the number of storage areas as the stack.

12. The computer device of claim 8, wherein the processor is further caused to:

in response that the plurality of output feature maps are in a matrix form, obtain a target matrix with a number of rows and a number of columns from a storage device of the computer device, the number of rows and the number of columns being greater than a preset threshold;

detect a matrix capacity of the target matrix in the computer device, and count a target row number and a target column number of the target matrix;

count an output row number and an output column number of the plurality of output feature maps;

generate the plurality of image sizes according to a calculation formula, the matrix capacity, the target row number, the target column number, the output row number and the output column number, the calculation formula being represented as:

$$y = \frac{k}{a \times b} \times m \times n,$$

wherein y represents the plurality of image sizes, k represents the matrix capacity, a represents the target row number, b represents the target column number, m represents the output row number, and n represents the output column number.

13. The computer device of claim 8, wherein the processor is further caused to:

in response that the plurality of output feature maps are images, identify a plurality of pixel types of a plurality of pixels in the plurality of output feature maps;

obtain a pixel capacity occupied by a plurality of pixel points corresponding to the plurality of pixel types;

count a number of the plurality of pixels in the plurality of output feature maps; and generate the plurality of image sizes according to the pixel capacity and the number of the plurality of pixels.

14. The computer device of claim 8, wherein the processor is further caused to:

write the plurality of image sizes into the stack in an order from bottom to up.

15. A non-transitory storage medium having stored thereon at least one computer-readable instructions, which when executed by a processor of a computer device, causes the processor to perform a method for detecting image sizes, the method comprising:

obtaining a pre-trained image processing model, and obtaining an input image;

establishing a stack according to a number of network layers of the pre-trained image processing model;

obtaining a plurality of output feature maps by processing the input image using the pre-trained image processing model;

detecting a plurality of image sizes of the plurality of output feature maps;

writing the plurality of image sizes into the stack in sequence, deleting the network layers iteratively in an order from large to small according to an execution sequence of the network layers of the pre-trained image processing model until the stack is full, and obtaining a plurality of output sizes of the input image in each of the network layers.

16. The non-transitory storage medium of claim 15, wherein obtaining the pre-trained image processing model comprises:

receiving a memory reservation request;

analyzing a report of the memory reservation request, and obtaining data information carried by the report;

extracting path information from the data information based on a preset flag, and obtaining a model usage from a storage path corresponding to the path information; and obtaining the pre-trained image processing model from the storage path according to the model usage.

17. The non-transitory storage medium of claim 16, wherein obtaining the pre-trained image processing model from the storage path according to the model usage comprises:

obtaining a user requirement of a triggering user of the memory reservation request;

detecting whether the model usage meets the user requirement; and in response that the model usage meets the user requirement, obtaining a model corresponding to the model usage from the storage path as the pre-trained image processing model.

18. The non-transitory storage medium of claim 15, wherein establishing the stack according to the number of network layers of the pre-trained image processing model comprises:

counting the number of the network layers of the pretrained image processing model;

establishing storage areas according to the number of the network layers, and in response that a number of storage areas is equal to the number of the network layers, determining the number of storage areas as the stack.

19. The non-transitory storage medium of claim 15, wherein detecting the plurality of image sizes of the plurality of output feature maps comprises:

in response that the plurality of output feature maps are in a matrix form, obtaining a target matrix with a number of rows and a number of columns from a storage device of the computer device, the number of rows and the number of columns being greater than a preset threshold;

detecting a matrix capacity of the target matrix in the computer device, and counting a target row number and a target column number of the target matrix;

counting an output row number and an output column number of the plurality of output feature maps;

generating the plurality of image sizes according to a calculation formula, the matrix capacity, the target row number, the target column number, the output row number and the output column number, the calculation formula being represented as:

$$y = \frac{k}{a \times b} \times m \times n,$$

wherein y represents the plurality of image sizes, k represents the matrix capacity, a represents the target row number, b represents the target column number, m represents the output row number, and n represents the output column number.

20. The non-transitory storage medium of claim 15, wherein detecting the plurality of image sizes of the plurality of output feature maps comprises:

in response that the plurality of output feature maps are images, identifying a plurality of pixel types of a plurality of pixels in the plurality of output feature maps;

obtaining a pixel capacity occupied by a plurality of pixel points corresponding to the plurality of pixel types;

counting a number of the plurality of pixels in the plurality of output feature maps; and generating the plurality of image sizes according to the pixel capacity and the number of the plurality of pixels.

* * * * *